April 7, 1925.                                              1,532,961
J. L. TRAVERS
ROD AND STEM PACKING
Filed Sept. 26, 1924

INVENTOR.
John L. Travers
BY
HIS ATTORNEYS.

Patented Apr. 7, 1925.

1,532,961

UNITED STATES PATENT OFFICE.

JOHN L. TRAVERS, OF PALMYRA, NEW YORK, ASSIGNOR TO CRANDALL PACKING COMPANY, OF PALMYRA, NEW YORK.

ROD AND STEM PACKING.

Application filed September 26, 1924. Serial No. 740,110.

*To all whom it may concern:*

Be it known that I, JOHN L. TRAVERS, a citizen of the United States, and resident of Palmyra, in the county of Wayne and State of New York, have invented certain new and useful Improvements in Rod and Stem Packings, of which the following is a specification.

The present invention relates to rod and stem packing, and an object thereof is to provide a universal rod and stem packing which will be semi-metallic in character and self-lubricating. Another object of the invention is to provide a packing having an outer shell or casing formed of a soft pliable metal such as lead or lead composition and an inner core of lubricant absorbing material, preferably heat resisting, as asbestos, communicating with the exterior of the shell through openings which permit oil from the rod or stem to pass into the core or vice versa.

To these and other ends, the invention consists of certain parts and combinations of parts, all of which will be hereinafter described, the novel features being pointed out in the appended claims.

Figure 1:
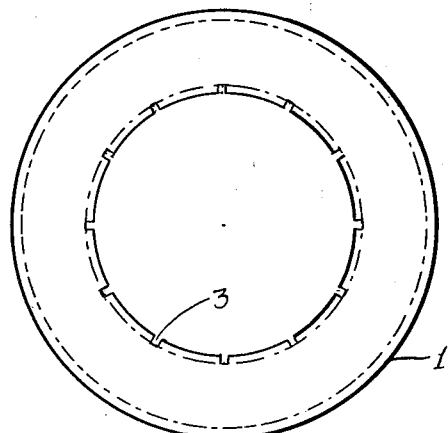
Fig. 1 shows one embodiment of the packing.
Figure 2:
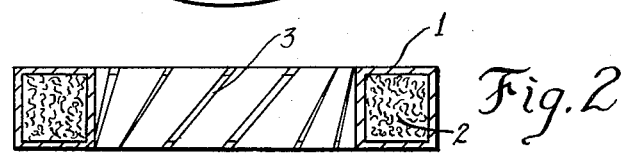
Fig. 2 is a section on the line 2—2, Fig. 1.
Figure 3:
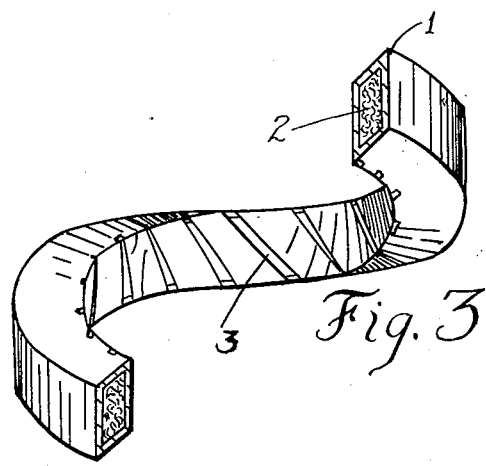
Fig. 3 is a perspective view showing the packing opened for insertion into a stuffing box.

Referring more particularly to the embodiments of the invention herein illustrated, 1 indicates the outer casing or shell formed of a soft pliable metal such as lead or lead composition, and 2 indicates an inner core or filler formed of absorbent material and preferably heat resisting material, such as asbestos. In making the packing, this asbestos or other lubricant absorbing material is saturated with a lubricant and the wall of the shell or casing is provided with openings. These openings may be of any form. In Figs. 1, 2 and 3, they are in the form of diagonal slots 3 in the inner periphery of the ring. Not only do these openings permit the lubricant from the absorbent material or asbestos to pass to the rod or stem, but they serve to collect any surplus lubricant on the rod or stem, and re-feed the same to the rod or stem when the latter becomes dry. Owing to the fact that the openings on the inner periphery of the ring are of diagonal formation and extend from one side of the ring to the other, it is possible to assemble together a number of rings in order to provide channels or passageways leading throughout the entire series of rings.

The shell or casing being made of soft pliable metal may be tightly forced about the rod or stem to form a tight joint and will act without any lubricating material as a lubricant. The filler or absorbent material will feed the lubricant to the rod or stem and collect any surplus lubricating material, and being made of heat resisting material such as asbestos will not be affected by heat.

What I claim as my invention and desire to secure by Letters Patent is:

1. A packing ring having a cylindrically formed inner periphery provided with slots communicating with the interior of the packing ring and extending from one side of the ring to the other at an angle to the axis of the ring, and a core of lubricant absorbent material enclosed in said packing ring.

2. A packing ring having a cylindrically formed inner periphery provided with slots communicating with the interior of the ring and extending from one side of the ring to the other, and a core of lubricant absorbent material enclosed in the packing ring.

JOHN L. TRAVERS.